(12) United States Patent
Hasselmann

(10) Patent No.: US 8,491,966 B2
(45) Date of Patent: Jul. 23, 2013

(54) METHOD FOR INTRODUCING A CATALYTIC COATING INTO THE PORES OF A CERAMIC HONEYCOMB FLOW BODY

(75) Inventor: Wolfgang Hasselmann, Rheinfelden (DE)

(73) Assignee: Umicore AG & Co. KG, Hanau-Wolfgang (DE)

(*) Notice: Subject to any disclaimer, the term of this patent is extended or adjusted under 35 U.S.C. 154(b) by 720 days.

(21) Appl. No.: 12/531,362

(22) PCT Filed: Mar. 18, 2008

(86) PCT No.: PCT/EP2008/053214
§ 371 (c)(1),
(2), (4) Date: Dec. 2, 2009

(87) PCT Pub. No.: WO2008/113801
PCT Pub. Date: Sep. 25, 2008

(65) Prior Publication Data
US 2010/0093527 A1   Apr. 15, 2010

(30) Foreign Application Priority Data
Mar. 19, 2007 (DE) .......................... 10 2007 012 928

(51) Int. Cl.
*B05D 1/32* (2006.01)
(52) U.S. Cl.
USPC ...... 427/282; 502/334; 427/182; 427/213.31; 427/232; 427/238; 427/259
(58) Field of Classification Search
USPC .......................................................... 427/282
See application file for complete search history.

(56) References Cited

U.S. PATENT DOCUMENTS 4,557,682 A * 12/1985 Montierth ..................... 425/121
4,670,205 A    6/1987 Montierth
(Continued)

FOREIGN PATENT DOCUMENTS

EP    1719881 A2    11/2006
GB    2275624       9/1994
(Continued)

OTHER PUBLICATIONS

PCT International Preliminary Report on Patentability (Form PCT/IB/373) for PCT/EP2008/053214 dated Oct. 6, 2009 (in English language).
PCT Written Opinion of the International Searching Authority (Form/ISA/237) for PCT/EP2008/053214 dated Oct. 6, 2009 (in English language).

*Primary Examiner* — Michael Cleveland
*Assistant Examiner* — Sarah R Anderson
(74) *Attorney, Agent, or Firm* — Smith, Gambrell & Russell, LLP

(57) ABSTRACT

Disclosed herein is a process for coating ceramic honeycomb bodies with a catalyst suspension comprising catalyst components as solids and/or in dissolved form in a carrier liquid. Parallel flow channels run through the honeycomb bodies. The walls of the flow channels have an open pore structure. To coat the channel walls and in particular also the interior surfaces of the pores with the catalyst suspension, the entry and exit end faces of the vertically aligned honeycomb bodies are each brought into contact with a perforated mask, with the perforated masks being arranged so that the open regions of the perforated mask on the one end face are opposite the closed regions of the perforated mask on the other end face and vice versa. The catalyst suspension is then pumped or sucked from below into the honeycomb bodies until it exits at the upper end face. Excess suspension is then removed by blowing-out or sucking-out, the contact with the perforated masks is released and the honeycomb body is calcined to fix the coating.

7 Claims, 3 Drawing Sheets

U.S. PATENT DOCUMENTS

| | | | |
|---|---|---|---|
| 5,021,204 A * | 6/1991 | Frost et al. | 264/630 |
| 5,334,570 A | 8/1994 | Beauseigneur et al. | |
| 6,149,973 A * | 11/2000 | Foerster et al. | 427/235 |
| 2002/0042344 A1* | 4/2002 | Kondo et al. | 502/527.19 |
| 2006/0194018 A1* | 8/2006 | Ohno et al. | 428/116 |
| 2006/0217262 A1* | 9/2006 | Yoshida | 502/304 |
| 2008/0200328 A1* | 8/2008 | Eberle et al. | 502/100 |
| 2009/0305874 A1* | 12/2009 | Pfeifer et al. | 502/74 |

FOREIGN PATENT DOCUMENTS

| | | |
|---|---|---|
| WO | WO 2004/091786 A1 | 10/2004 |
| WO | WO 2006125649 A2 * | 11/2006 |
| WO | WO 2007073807 A2 * | 7/2007 |

* cited by examiner

METHOD FOR INTRODUCING A CATALYTIC COATING INTO THE PORES OF A CERAMIC HONEYCOMB FLOW BODY

CROSS-REFERENCE TO RELATED APPLICATION DATA

This application is a 371 National Phase entry of PCT/EP2008/053214, filed 18 Mar. 2008, and claims priority to DE 102007012928.0, filed 17 Mar. 2007.

INTRODUCTION AND BACKGROUND

The invention relates to a process by means of which a catalytic coating can be introduced into the pores of a ceramic flow-through honeycomb body using a catalyst suspension comprising catalyst components as solids and/or in dissolved form in a carrier liquid. The coated honeycomb bodies are preferably used for the purification of automobile exhaust gases.

Catalysts applied in the form of a coating to honeycomb bodies have for decades been used for the purification of automobile exhaust gases. Parallel flow channels for the exhaust gases run through the honeycomb bodies. Ceramic honeycomb bodies are produced from refractory materials. The material is predominantly cordierite, a magnesium-aluminum silicate. Further customary ceramic materials are silicon carbide, aluminum oxide, zirconium oxide, zirconia-mullite, mullite, silicon nitride, aluminum titanate and titanium oxide. The honeycomb bodies are produced from these materials by extrusion and generally have an open pore structure.

The flow channels run through the honeycomb bodies from the entry end face to the exit end face. The channels generally have a square cross section and are arranged in a dense grid pattern over the cross section of the honeycomb bodies. The number of flow channels per unit cross-sectional area is referred to as the cell density and can be in the range from 10 to 200 $cm^{-2}$.

The catalytic coating of the honeycomb bodies is a dispersion coating which is applied to the honeycomb bodies using a usually aqueous suspension of the catalyst components. This coating is frequently also referred to as a washcoat.

The catalyst components comprise, for example, pulverulent support materials having a high specific surface area onto which the catalytically active components, usually the noble metals of the platinum group, platinum, palladium, rhodium, iridium and ruthenium are applied. The solids in the catalyst suspension are generally homogenized by wet milling before being applied to the honeycomb bodies. After milling, the solids of the suspension have an average particle size $d_{50}$ in the range from 3 to 5 μm.

Examples of support materials are simple and composite oxides, e.g. active aluminum oxide, zirconium oxide, tin oxide, cerium oxide or other rare earth oxides, silicon oxide, titanium oxide or silicates such as aluminum silicate or titanates such as barium or aluminum titanate and zeolites. The various phases of active transition aluminum oxide which can be stabilized by doping with silicon oxide and lanthanum oxide and also by zirconium oxide and cerium oxide have been found to be particularly useful as heat-resistant support materials.

The catalytic activity and aging stability of the finished catalyst is generally greater the greater the concentration of the catalytic composition on the honeycomb body. In practice, from 10 to 300 g/l are required, depending on the application. However, the maximum achievable concentration can be below the catalytically required concentration for various reasons. Thus, the adhesion of the coating decreases with increasing concentration and thus layer thickness. In addition, high layer thicknesses reduce the hydraulic diameter of the flow channels and thus increase the counter pressure of the exhaust gas (banking-up pressure) through the catalyst.

There are fields of application, for example the oxidation of hydrocarbons and carbon monoxide in diesel exhaust gas ("diesel oxidation catalyst"), in which only a relatively low mass of catalyst in the range from 100 to 200 g per liter of honeycomb body volume is necessary for the reaction. A further increase in the mass of catalyst while maintaining the total noble metal content is not associated with any activity advantage in this case. In other catalytic reactions, for example the storage and reduction of nitrogen oxides ("nitrogen oxide storage catalyst") or the selective catalytic reduction of nitrogen oxides by means of ammonia ("SCR catalyst"), on the other hand, an increase in the active mass is desirable but, owing to the above-mentioned problems with adhesion of the coating and the banking-up pressure through the finished catalyst, is possible only within limits.

U.S. Pat. No. 5,334,570 proposes reducing the high banking-up pressure by relocating the catalytic coating into the pores of ceramic honeycomb bodies. The ceramic honeycomb bodies used in this patent had an open porosity of from 30 to 45% and an average pore diameter of from 3 to 10 μm. Catalyst materials which have colloidal particle diameters in the range from 0.001 to 0.1, preferably from 0.001 to 0.05 μm, and on contact of the honeycomb bodies with a corresponding colloidal coating suspension penetrate into the pores of the honeycomb bodies were therefore selected for catalytic coatings. According to the patent, the honeycomb bodies were contacted with the coating suspension by dipping them into the coating suspension. In this way, from 90 to 95% of the colloidal washcoat particles could be introduced into the pores of the honeycomb bodies so that the cross section of the flow channels was barely reduced by the coating and the banking-up pressure was thus increased only inconsequentially.

In recent years, ceramic honeycomb bodies having a significantly increased porosity of about 60-65% and average pore diameters of from 10 to 20 μm have been developed. The objective here was to make the channel walls permeable to the catalyst particles, so that the latter could deposit not only as a layer on the channel surface but also in the pore system of the wall. In this way, lower layer thicknesses at a comparable catalyst mass or, conversely, higher loading concentrations at the same catalyst layer thickness can be achieved [Tao et al., SAE 2004-01-1293].

To coat honeycomb bodies, the catalytically active, water-insoluble, pulverulent components are usually suspended in water or an organic liquid, milled and the substrate is subsequently coated by dipping into the suspension, by pouring the suspension over the substrate or by drawing-in or pumping-in of the suspension.

If use is made here of the above-described, newly developed porous honeycomb bodies, part of the catalytically active substances actually penetrate into the pore system of the honeycomb body and is deposited there. However, this increases the amount of catalyst deposited on the honeycomb body to only a small extent.

SUMMARY OF THE INVENTION

It is an object of the present invention to provide a process for coating porous honeycomb bodies, which allows both the exterior surfaces of the flow channels and the pores of the channel walls to be coated with a catalyst. In this way, it should be possible to coat the honeycomb bodies with a larger amount of catalyst material than would be possible by conventional processes, without the banking-up pressure through the honeycomb body being increased.

The process uses ceramic honeycomb bodies through which parallel flow channels which are separated from one another by channel walls having an open pore structure run from an entry end face to an exit end face. Coating is carried out using a catalyst suspension comprising solids suspended in a carrier liquid. The process for achieving the object of the invention has the following process steps:
a) contacting of the two end faces of the honeycomb body with in each case a perforated mask having open and closed regions, with the perforated masks being arranged so that the open regions of the perforated mask on the one end face are opposite the closed regions of the perforated mask on the other end face,
b) introduction of the catalyst suspension through the perforated mask on the one end face of the honeycomb body until the suspension exits through the perforated mask on the other end face,
c) blowing-out or sucking-out of any excess catalyst suspension,
d) release of the contact with the perforated masks and
e) calcination of the coated honeycomb body.

For the purposes of the present invention, the term honeycomb bodies refers to flow-through honeycomb bodies whose flow channels are open at both ends. According to the invention, these flow channels are only temporarily closed alternately at entry and exit end faces for the purpose of coating. This contrasts with wall-flow honeycomb bodies in which adjacent flow channels are permanently closed alternately at entry and exit end faces.

In the first process step, the entry and exit end faces are each covered by a perforated mask. Here, the open regions (holes) of the one perforated mask are located opposite the closed regions of the other perforated mask.

During the coating operation, the arrangement of the honeycomb body between the inverse perforated masks resembles a wall flow filter for removing soot from a diesel exhaust gas. Unlike the case of a wall flow filter in which adjacent flow channels are alternately closed at the end faces, it has been found that it is sufficient for the open and closed regions of the perforated masks each to cover a plurality of flow channels of the honeycomb body in order to achieve a good coating result. This is particularly advantageous in the case of many-celled honeycomb bodies having a cell density of more than 30 $cm^{-2}$ since it reduces the demands on the perforated masks. In addition, the flow channels do not have to be aligned exactly with the holes of the perforated masks, which would be the case if the perforated masks had to have the cell pattern of the flow channels.

However, in the case of honeycomb bodies having a low cell density it can be advantageous for the holes of the perforated masks to be arranged in the pattern of the flow channels on the end faces. However, care then has to be taken to ensure precise alignment of the pattern of holes with the flow channels on contacting of the perforated masks with the end faces of the honeycomb body, i.e. the open and closed regions of the perforated masks are in this case positioned relative to one another so that adjacent flow channels are alternately closed during coating. In this case, the two perforated masks thus have an inverse pattern of holes.

The open and closed regions of the two perforated masks are arranged in different but periodic patterns with a grid spacing from one another. The open regions can be circular, square, rectangular, hexagonal or slit-shaped. The cross-sectional areas of the holes on the one perforated mask can differ from the holes on the other end face. This makes it possible for a person skilled in the art to optimize the flow through the channel walls of the honeycomb bodies.

In the second process step, the catalyst suspension is introduced through the perforated mask on the one end face of the honeycomb body until the suspension exits through the perforated mask on the other end face. In this way, the catalyst suspension is forced to pass through the porous channel walls in order to get from one end face to the other. The pores of the honeycomb body are in the process coated with the catalyst composition.

In the further process steps, excess catalyst suspension is blown out or sucked out. The contact with the perforated masks is then released and the honeycomb body is calcined in order to fix the coating and convert the catalyst constituents into their catalytically active form.

During introduction of the catalyst suspension into the honeycomb body, the honeycomb body is preferably aligned so that its flow channels are vertical and the suspension is introduced into the honeycomb body through the perforated mask on the lower end face until it exits through the perforated mask on the upper end face. For this purpose, the catalyst suspension can be pressed, pumped or sucked into the honeycomb body.

During coating, the perforated masks rest against the end faces of the honeycomb body and are therefore not subjected to any great mechanical stresses. They are therefore preferably made of plastic, which also reduces the risk of damage to the honeycomb body. Improved protection against unintentional damage to the end faces of the honeycomb body on contact with the masks is obtained when the perforated masks are laminated with an elastic plastic film on the side on which they are brought into contact with the end faces of the honeycomb body. The elastic plastic film also improves the seal between perforated mask and end face and thus reduces unintentional exit of liquid between mask and honeycomb body.

In contrast to conventional processes for coating honeycomb bodies, the process forces the catalyst suspension to flow through the pore system of the channel walls during the coating operation. In this way, the surfaces of the pores are specifically coated. Depending on the particle size distribution of the solids in the coating suspension and on the average pore diameter of the ceramic material of the honeycomb body, more or less pronounced filtration of the coating suspension occurs. Appropriate choice of the particle size distribution thus makes it possible to set a defined mass ratio of the coating suspension deposited in the pores to the coating suspension deposited on the channel walls. However, preference is given to introducing a high proportion of the catalyst suspension into the pores of the channel walls in order to keep the coating of the wall surfaces at the desired coating concentration as small as possible. At an appropriately low coating concentration, it is even possible to accommodate all of the catalyst composition in the pores.

It is generally possible to use all porous honeycomb bodies having open porosity for the process of the invention. Depending on the average pore size, the solids of the coating dispersion have to have correspondingly small particle diameters. The solids in the catalyst suspension are preferably milled so finely that the $d_{90}$ particle diameter is smaller than the average pore diameter of the honeycomb body.

In the case of average pore sizes in the range from 3 to 10 μm, preference is given to using solids having average particle diameters in the colloidal range (<1 μm). However, solids having an average particle size $d_{50}$ in the range from 3 to 5 μm or from 1 to 3 μm are also suitable. Solids having a broad particle size range or solids having a multimodal particle size distribution can also be used. A filtration then takes place during coating: particles having small particle diameters are deposited in the pores of the honeycomb body while the larger particles are deposited on the channel walls.

However, preference is given to using highly porous honeycomb bodies having a porosity in the range from 30 to 90% and an average pore diameter in the range from 10 to 50 μm. A large proportion of the solids of the coating suspension can be introduced into these pores when the $d_{90}$ diameter of the solid particles is less than the average pore diameter of the pores of the honeycomb body.

The process of the invention allows, in comparison with standard honeycomb bodies, a more catalytically active composition to be applied to the channel surface at a comparable layer thickness or to the support at a comparable hydraulic diameter of the flow channel.

To carry out the coating process, it is possible to use a coating plant as is described, for example, in WO 2004/091786 by the applicant.

BRIEF DESCRIPTION OF DRAWINGS

The following examples and figures illustrate the invention. In the figures.

DETAILED DESCRIPTION OF INVENTION

Figure 1:
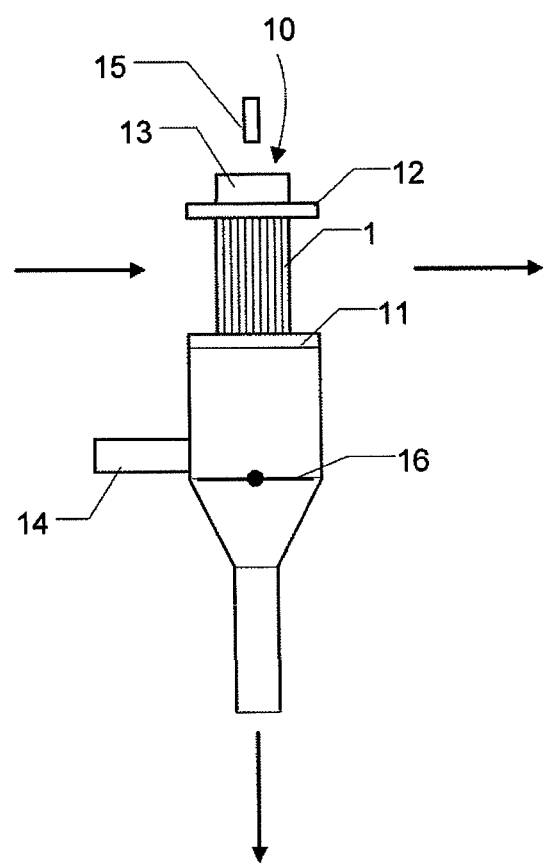
FIG. 1 shows a coating station for carrying out the process.

To carry out the coating process, it is possible to use a coating plant as is described, for example, in WO 2004/091786 by the applicant. FIG. 1 shows a coating station of this coating plant. The coating station comprises a tubular lower part on which a workpiece holder (11) is fitted at the upper end. The catalyst suspension is fed to the lower part via the pipe (14) from a reservoir. The lower part is closed off at the bottom by a flap (16) during the introduction of catalyst suspension. Below the flap, the lower part is connected to a subatmospheric pressure reservoir and a demister.

The honeycomb body (1) to be coated is brought to the coating station from, for example, the left and placed in the workpiece holder (11). A second workpiece holder (12) having an overflow (13) is then placed on the upper end face of the honeycomb body. The workpiece holders contain the perforated masks and inflatable sealing sleeves in order to prevent catalyst suspension from leaking out between the honeycomb body and workpiece holder. The configuration of the workpiece holders is shown by way of example in FIG. 2.

To carry out coating, catalyst suspension is pumped into the lower part of the coating station with the flap (16) closed and pushed through the lower end face into the honeycomb body until the suspension exits at the upper end face. Exit of the suspension is detected by the sensor (15) and ends the pumping-in of the suspension. Immediately afterward, the flap (16) is opened and the catalyst suspension is sucked out from the honeycomb body by application of subatmospheric pressure. The honeycomb body is then taken from the coating station and dried and calcined to fix the catalyst suspension.

Figure 2:
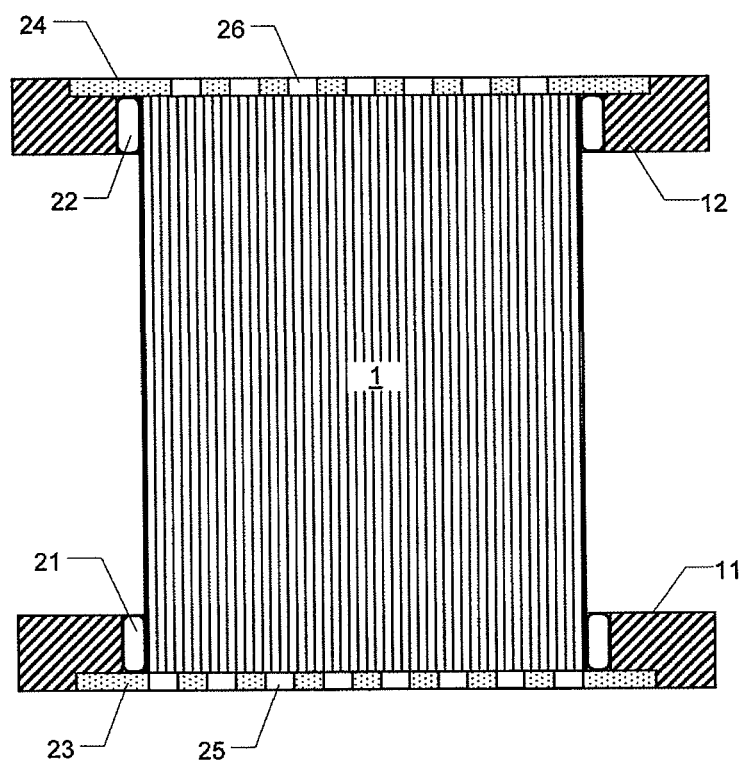
FIG. 2 shows a honeycomb body having a lower and upper workpiece holder.

FIG. 2 shows honeycomb bodies and workpiece holders in detail. The lower workpiece holder (11) contains a perforated mask (23) having holes (25). To carry out coating, the honeycomb body is placed on the perforated mask (23). The honeycomb body is sealed against exit of liquid by means of the inflatable rubber sleeve (21). The upper workpiece holder has a completely analogous construction. Reference numeral (24) denotes the upper perforated mask having the holes (26). The holes of the upper perforated mask are offset relative to the holes of the lower perforated mask so that the closed regions of the lower perforated mask are located opposite to the holes in the upper perforated mask.

The holes in the perforated masks (23) and (24) can be larger than the cross section of the flow channels and therefore do not have to be aligned in terms of the position with the flow channels of the honeycomb body.

Comparative Example

A honeycomb body made of cordierite and having a Pt/aluminum oxide oxidation catalyst was coated in a conventional manner. The honeycomb body had the following properties:
Diameter: 12 cm
Length: 7 cm
Cell density 62 $cm^{-2}$
Average pore diameter: 25 μm The catalyst suspension had a solids content of 42% by weight. The solids of the suspension were milled to an average particle size $d_{50}$ in the range from 3 to 5 μm with a $d_{90}$ particle size of less than 19 μm before coating.

The coated honeycomb body had a coating of 120 g/l after calcination.

Example

A further honeycomb body having the same properties as in the comparative example was coated with the catalyst suspension of the comparative example by the process of the invention.

Figure 3:
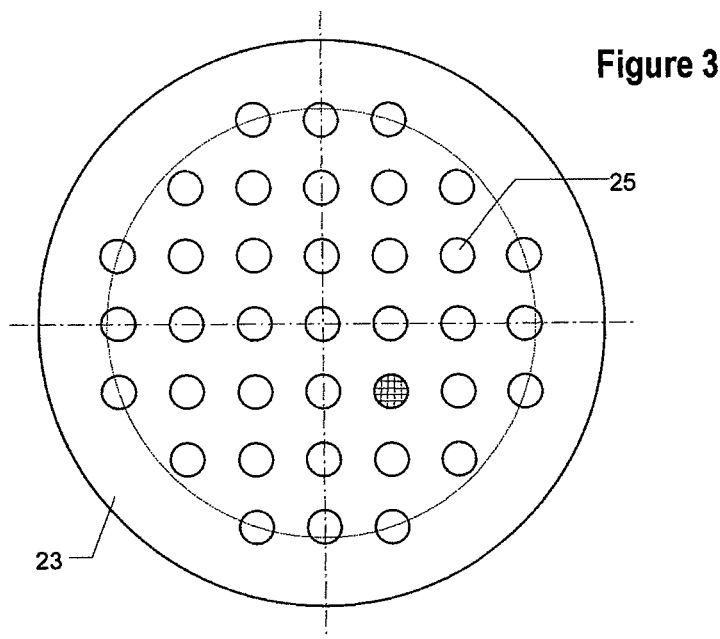
FIG. 3 shows the perforated mask of the lower workpiece holder according to the example.

As perforated mask for the lower end face, use was made of a perforated mask having holes as shown in FIG. 3. The holes (25) had a diameter of 6 mm and were arranged in a square grid having a grid spacing of 12 mm. The diameter of the honeycomb body is indicated by the circle shown as a dotted line. The grid of the flow channels of the honeycomb body is indicated in one hole of the perforated mask. The holes selected for the perforated mask cover about 18 flow channels.

Figure 4:
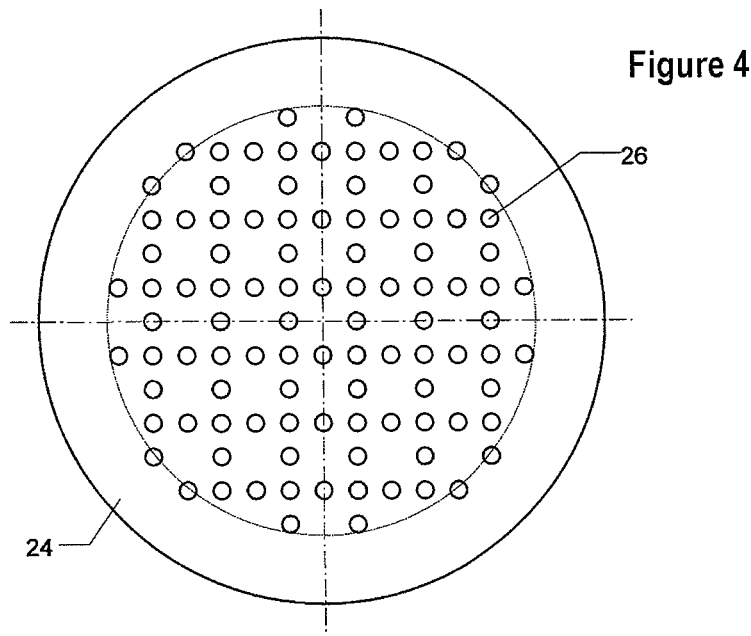
FIG. 4 shows the perforated mask of the upper workpiece holder according to the example.

As perforated mask for the upper end face, use was made of a perforated mask having holes as shown in FIG. 4. The holes of this mask had a diameter of 3 mm.

After calcination, the honeycomb body was coated with 20% more solids than the honeycomb body of the comparative example. The banking-up pressure of this honeycomb body at a flow of 200 standard m³/h did not differ from the banking-up pressure of the honeycomb body of the comparative example.

These results demonstrate that the process of the invention improves the deposition of catalyst composition in the pores of the honeycomb body and thus enables the coating concentration to be increased without worsening the banking-up pressure.

The invention claimed is:

1. A process for introducing a catalytic coating into the pores of a ceramic flow-through honeycomb body through which parallel flow channels which are separated from one another by channel walls having an open pore structure run between two end faces, with coating being carried out using a catalyst suspension comprising solids suspended in a carrier liquid, which comprises a) contacting the two end faces of the honeycomb body with in each case a perforated mask having a plurality of open and closed regions, with the perforated masks being arranged so that the plurality of open regions of the perforated mask on the one end face are opposite the closed regions of the perforated mask on the other end face, wherein the area of each open and closed region covers a plurality of flow channels, the plurality of open regions have a grid spacing, and the cross-sectional areas of the open regions of both perforated masks are different, b) introducing the catalyst suspension through the perforated mask on the one end face of the honeycomb body until the suspension exits through the perforated mask on the other end face which thereby forces the catalyst suspension to flow through and coat the open pore structure of the channel walls, c) blowing-out or sucking-out any excess catalyst suspension, d) releasing the contact with the perforated masks, and e) calcining the coated honeycomb body to give the ceramic flow-through honeycomb body having the catalytic coating.

2. The process as claimed in claim 1, wherein the open regions of the perforated masks are circular, square, rectangular, hexagonal or slit-shaped.

3. The process as claimed in claim 2, wherein the perforated masks are laminated with an elastic plastic film on the side on which they are brought into contact with the end faces of the honeycomb body so as to prevent exit of liquid between the mask and the honeycomb body.

4. The process as claimed in claim 1, wherein the perforated masks are made of plastic.

5. The process as claimed in claim 1, wherein the honeycomb body has a porosity in the range from 30 to 90% with an average pore diameter of from 10 to 50 µm.

6. The process as claimed in claim 5, wherein the particle size $d_{90}$ of the solids of the suspension is smaller than the average pore diameter of the pores of the honeycomb body.

7. The process as claimed in claim 1, wherein the catalyst suspension is introduced into the honeycomb body by pressing-in, pumping-in or sucking-in in step b).

* * * * *